US006797072B1

(12) United States Patent
Richardson

(10) Patent No.: US 6,797,072 B1
(45) Date of Patent: Sep. 28, 2004

(54) PROCESS FOR RESTORING MAGNETIC RECORDING TAPE DAMAGED BY "STICKY SHED" SYNDROME

(76) Inventor: Charles A. Richardson, 1938 Baltimore Annapolis Blvd., Annapolis, MD (US) 21401

(*) Notice: Subject to any disclaimer, the term of this patent is extended or adjusted under 35 U.S.C. 154(b) by 0 days.

(21) Appl. No.: 10/663,886

(22) Filed: Sep. 17, 2003

(51) Int. Cl.[7] ................................................. B08B 1/02
(52) U.S. Cl. ............................ 134/15; 134/18; 134/21; 134/22.19; 134/23; 134/32; 360/15; 360/137; 510/167; 510/421; 510/506
(58) Field of Search ............................ 134/15, 18, 21, 134/22.19, 23, 32; 360/15, 137; 510/167, 451, 506

(56) References Cited

U.S. PATENT DOCUMENTS

| 4,849,839 | A |   | 7/1989  | Tsubota et al. |
|-----------|---|---|---------|----------------|
| 5,080,825 | A |   | 1/1992  | Bradshaw |
| 5,236,790 | A |   | 8/1993  | Medeiros et al. |
| 5,311,371 | A |   | 5/1994  | Clark |
| 5,638,236 | A |   | 6/1997  | Scott |
| 5,786,949 | A |   | 7/1998  | Sakamoto |
| 5,830,556 | A | * | 11/1998 | Miyazaki et al. ........... 428/141 |

OTHER PUBLICATIONS

Article published in Washington Post in May, 1989, Agfa Forum Focuses on Saving Old Tapes.
Dec., 1994 edition of Pro Sound News (Eddie Giletti Report).
Nov. 29, 1995 edition of Radio World, Article titled "Clean & Restore Old Analog Tapes".
Publication dated Feb. 17, 2002, by Magnetic Reference Laboratory, Inc.
Paper Presented at 113th Convention of the Audio Engineering Society titled "Archiving Audio" Oct. 2002.
Jul./Aug., 2003 edition of Audio Media, Article titled "Archiving Issues, Part One: Recommendations".

* cited by examiner

*Primary Examiner*—Michael Barr
*Assistant Examiner*—Gentle E. Winter
(74) *Attorney, Agent, or Firm*—H. Jay Spiegel

(57) ABSTRACT

A process for restoring magnetic recording tape damaged by "Sticky Shed" syndrome cleans magnetic tapes of the Backcoating which is causing their eventual degradation and destruction. The Backcoating is first removed in a multi-step process. A liquid cleaner, such as isopropyl alcohol, is applied to the Backcoating to dissolve it from and clean it off the Mylar Base. Before the liquid cleaner is applied, steps are taken to prevent the cleaner fluid from getting onto the Oxide side of the tape. The chemical cleaning is done as quickly as possible. The second step is to dry clean the Base surface of the tape to remove the remaining solvent and the debris of any remaining Backcoating. Then, the Oxide side of the tape is given a dry, non-chemical cleaning to remove the residue of contamination of the Backcoating which was deposited on the Oxide side of the tape as the result of physical contact with the Backcoating from the storage on the reel of tape. Once fully and properly cleaned, the tape is restored to a useful and long life. A machine is disclosed to carry out various mechanical and chemical actions involved in the inventive process in a safe and logical manner.

25 Claims, 3 Drawing Sheets

PROCESS FOR RESTORING MAGNETIC RECORDING TAPE DAMAGED BY "STICKY SHED" SYNDROME

BACKGROUND OF THE INVENTION

The present invention relates to a process for restoring magnetic recording tape damaged by "Sticky Shed" syndrome.

Tape recording technology had its first beginnings in the late 1930s and early 1940s, and has continued to this day with a stream of changes and improvements to magnetic tapes and also to tape machines. Various standards for both tape and machines have also developed over time. The appeal of tape-recording is that one is able to form an analogous magnetic memory bank of magnetic patterns and impulses that can capture all kinds of acoustic events when the tape is recorded and played back at another time. Thus, tape and tape-recording are invaluable for capturing all kinds of sounds from sound effects, speech, as well as acoustic or electronic music. Recordings contain a vast personal, cultural, artistic, and historical value as well as a substantial monetary value when these recordings are copied, sold and played.

Tape-recordings were a new and better technology that replaced the older cylinder methods, the older direct recording to acetate or wax discs, and wire tape recorders. Today, the tape-recording industry is large and active, but it is facing competition from the newer digital and computer technologies, which at least supplement tape-recording, and which may replace tapes, particularly so if the tape problem of "Sticky Shed" is not solved and if tape-recordings are damaged or lost due to improper handling or destructive restoration efforts by those who do not understand the problems inherent in restoration, or who do not use a restoration process that best preserves tape and program integrity.

The earliest tapes used paper as a base for the tape. This did not work very well and the paper base was soon replaced by an Acetate Base. The Acetate Base is somewhat fragile and can be easily broken. Also, Acetate tapes need proper storage conditions of temperature and humidity to remain in good playing condition. In the early 1960s, a new Mylar Base material was invented that replaced Acetate. The Mylar Base tapes are much stronger than Acetate, and do not easily break, and also do not require rigid temperature and humidity control conditions to remain in good condition.

The other main element of a tape is the Oxide material and the binder chemicals that hold the Oxide to the Base. These Oxides and binders have undergone constant improvement over time. The Oxides range from Ferric Oxide to Chromium Dioxide to many variations thereof. The aim has been to get better and more powerful magnetic performance, a longer wear life, smoother surfaces, better frequency response, less noise, etc. The Binder is a chemical brew mixed with the Oxides, which is then processed to evaporate the solvents, leaving the Oxide coating on the Base, which is then rolled and smoothed out. The large tape rolls are then slit to various widths, and then put on reels for use on tape machines.

The third element in tape manufacture is the Backcoating. Backcoating was developed by Ampex. (now Quantegy) and other tape makers in the late 1960s, and added to tapes to improve the mechanical handling qualities of tapes by providing for a smoother tape wind and for reducing static build-up due to friction in the tape path of tape machines.

Prior to the introduction of Backcoating in the late 1960s, tapes did not have Backcoating. Although Backcoating helps with these mechanical problems of machines of the day, the fact is there is a price to pay for using Backcoating which is that, over time, it causes the chemical breakdown of the tape and leads to the tape problem of "Sticky Shed" which is damaging and is currently destroying many tapes which have Backcoating. The tape makers touted Backcoating as an improved product and thus customers demanded tapes that had Backcoating. Sales of Backcoated tapes increased, while the sales of non-Backcoated tapes decreased. Today, it is very difficult to even find non-Backcoated tape for purchase. Rarely, if ever, did any tape that did not have Backcoating exhibit the "Sticky Shed" problem. Nearly every tape that has Backcoating has "Sticky Shed" problems to a varying degree. Thus, Applicant has concluded that the Backcoating is the bad actor in this situation. While Backcoating may have helped with some mechanical issues in the 1960s, it left behind a chemical time bomb which is destroying tapes today and will do more destruction in the future until and unless a process is used to solve the "Sticky Shed" problem. Backcoating is no longer needed as the problems it addressed either no longer exist or can be dealt with in other ways. Tapes need to have a long, safe, archival life, free of the "Sticky Shed" problem, and the best way to do that is to end the manufacture of tapes with Backcoating. However, it is often necessary and/or desirable to play old Backcoated tapes and the "Sticky Shed" problem makes the playing of old tapes difficult and endangers their future use.

A number of years after Backcoating was first applied to tapes, a new problem, which came to be known as the "Sticky Shed" problem, arose. Tapes now became sticky, which meant they would not play properly and smoothly on a tape machine. Instead of normal playback, the tapes now would stick to various mechanical parts in the tape path of a tape machine. This sticking would not only cause noise, but as the problem got worse, tapes either would not play at all, or even worse, would shed debris on the playback head which greatly impaired getting the proper or full magnetic and sound signal off the tape. In the worst case situations, the sticking Backcoating would rip the Oxide off the base of the tape, thus completely destroying all the magnetic data on the tape. Also, the sticking would cause the tape speed to vary, causing "flutter" of the program during playback.

Tape companies, users, and owners of tapes went into a state of dread and panic about losing these tapes, which concerns continue to the present day. There are millions of tapes with the "Sticky Shed" problem which has caused owners and users of tapes to face the grim prospect of losing, entirely, the valuable magnetic information on the tapes, or in getting inferior playback sound from these tapes. The "Sticky Shed" problem has thus compelled the industry to commence an extensive and expensive effort to transfer the content of the "Sticky Shed" tapes onto either digital media or other analog tapes.

The problem of "Sticky Shed" is well known in the tape-recording industry and numerous articles have been published discussing the problem and proposed solutions.

In an article published in the Washington Post in May, 1989, Agfa Corporation was reported to have introduced a five step labor intensive process described as "Agfa-NXT" that "involves a variety of techniques ranging from cleaning to heat." In the December, 1994, edition of Pro Sound News, it was reported by Eddie Giletti that:

"Tapes with shedding problems can be cured, at least long enough to get a good transfer. Several manufacturers offer this service, or it can be done in-house. A low-temperature (140 degrees F.) baking process was found to reactivate the binder. The pack must be perfectly smooth or the tape surface will become uneven. Baking time varies with tape width, starting with one hour for quarter-inch tapes up to several hours for two-inch tapes. Flipping the tapes every half-hour ensures that the heat is distributed evenly. Tapes must cool before use."

In the Nov. 29, 1995 edition of Radio World, an article titled "Clean & Restore Old Analog Tapes" states the following:

"Hydrogen peroxide is the only solution recommended by Neuman for cleaning the surface or backcoat of a tape. It does not damage any of the tape's chemical components and is safe to the user. By all means, do not use alcohol or other solvents as they may permanently damage the tape.

Peroxide will effectively clean off the mold and its antiseptic properties will help inhibit future mold growth."

In a publication dated Feb. 17, 2002, and issued by the Magnetic Reference Laboratory, Inc., report is given to the following:

"For temporary shed reduction on existing tapes, try placing the tape in an oven at 120° F. (50° C.) for about a day, as recommended by Ampex."

In a paper presented at the 113$^{th}$ Convention of the Audio Engineering Society, Oct. 5–8, 2002, titled "Archiving Audio," the "sticky shed syndrome" is described and "baking sticky-shed tapes is a common method used to rejuvenate tapes with binder breakdown."

In the July/August, 2003 edition of Audio Media, an article titled "Archiving Issues, Part One: Recommendations" states that the "sticky shed syndrome" "can usually be fixed temporarily by baking the moisture out of the tape (a practice, by the way, which also usually loosens any splices on the tape)."

Thus, in the tape manufacturing and recording industry, virtually every solution for the "Sticky Shed" syndrome involves baking the tape with those recommending this procedure providing no assurance that the procedure can be practiced more than once and, in most cases, strongly recommending that the information on the tape be transferred to another medium after the baking has been completed.

The sole reference recommending a chemical solution recommends the use of hydrogen peroxide to remove mold from a tape and specifically counsels against using alcohol or any similar solvent for fear of damaging the tape.

Applicant is also aware of the following U.S. Patents:

U.S. Pat. No. 4,849,839 to Tsubota et al. (assigned to Sony Corporation) discloses mechanical cleaning of video tape to remove small debris which gets on the tape. There is no mention of the Backcoating nor any mention of chemical cleaning of the tape.

U.S. Pat. No. 5,080,825 to Bradshaw (assigned to IBM) discloses a water-based solvent for cleaning a tape drive. There is no discussion of cleaning of the Backcoating nor is the water-based solvent sufficiently strong enough to chemically remove the Backcoating as contemplated in the present invention. The solvent disclosed by Bradshaw is applied to the Oxide side of the tape as compared to the present invention in which a solvent is applied to the Backcoating side of the tape. In the present invention, the Oxide side is dry-cleaned.

U.S. Pat. No. 5,236,790 to Medeiros et al. (assigned to Ampex Systems Corporation) discloses a supposed solution to the "Sticky Shed" syndrome which requires heating of a magnetic recording tape to a level of at least 50° C. for a time period of at least 3 hours. The present invention differs from the teachings of Medeiros et al. as contemplating removing the Backcoating of a magnetic recording tape using a solvent at room temperature without any heating of the tape.

U.S. Pat. No. 5,311,371 to Clark discloses a magnetic tape data recovery method which includes the use of baking applied to data tapes. Again, the present invention contemplates removing the Backcoating of a magnetic recording tape without resort to any elevation of temperature.

U.S. Pat. No. 5,638,236 to Scott (assigned to Sony Corporation) discloses the use of cleaning patches on a tape located on the Oxide side of the tape to periodically clean clogged tape heads. The present invention differs from the teachings of Scott as contemplating using a solvent to remove the Backcoating from a magnetic recording tape, and no chemical on the Oxide side of the tape period.

U.S. Pat. No. 5,786,949 to Sakamoto (assigned to Sony Corporation) discloses a magnetic transfer apparatus including a tape cleaning arrangement. Sakamoto contemplates vacuum cleaning of tape debris on air tape guides during high speed video duplication. Sakamoto solely contemplates removal of loose debris during duplication and does not contemplate nor solve the "Sticky Shed" syndrome. Sakamoto does not contemplate using a chemical solvent nor dry-cleaning of the Oxide side of the tape as is the case in the present invention.

The baking methods are full of guesswork with little explanation why baking the tapes does provide for some relief to the "Sticky Shed" problem. Applicant has found that Backcoating breakdown is the cause of the "Sticky Shed" problem. Others blame the Binder. If the Binder were breaking down, the magnetic particles in the Oxide coating would fall off the tape. When Applicant cleans a tape machine tape path from contamination, a black residue is found to have been removed that is part of the Backcoating, not the orange color residue of the Oxide coating on the cotton swab cleaners. If the Oxide binder was really breaking down and falling off the tape, all is lost, and heating the tape up is not going to rejuvenate a binder or restore a magnetic pattern which is recorded on the tape.

In fact, heating a tape has negative consequences simply on the basis of the fundamentals of physics and chemistry. When a tape is heated, the Mylar Base material of the tape is expanded, which may loosen the Oxide and binder combination that was coated on the base during manufacture. Chemically, heating something up accelerates the aging process and starts other chemical activity going which uses heat as a catalyst for other mechanical and chemical changes to take place. Heating the tape also directly contradicts the general archival standard to control temperature and humidity to low and stable levels. Even if heating the tapes gives some short term benefit, the "Sticky Shed" problem is not eliminated, but, in time, returns with even more severity and damaging results until such time as the tape is destroyed entirely.

The Backcoating is made of a complex organic chemical with a strong Carbon component. Organic chemicals are inherently unstable. Also, organic, Carbon chemicals are hydrophilic in that they attract water vapor and moisture. The result is the start of fungus growth, and the likely formation of carbonic acid or other chemicals which in turn attack the Mylar Base of the tape, the Oxide itself, and the Oxide Binder on the other side of the Mylar Base of the tape. Because tape is wound on reels, one layer of the tape's Backcoating comes into direct physical contact with the Oxide and the Oxide Binder of the next wound layer of tape on the reel. The Backcoating has its own chemical changes going on internally, and it comes into direct contact with the non-organic Oxide that contains the invaluable magnetic particles which make tape perform its recording and playback functions. When different chemical elements such as Carbon, Water, and non-organic elements such as Iron Oxide come into contact, the result is a chemical reaction in which the Backcoating turns into a gooey consistency and glue, with a further chemical attack on the Oxide and the Binder which holds the Oxide to the Base. The baking of the tapes does nothing to remove these chemical ingredients from interacting with each other endlessly until tape destruction is complete.

The reason the baking method does provide some temporary improvement is twofold. First, the higher temperature drives off the moisture by evaporation, but it does so only for a short period of time until the Backcoating will again, in time, attract moisture back to the tape. Second, the Backcoating behaves in a manner similar to wax, in that, at room temperature, the wax is a sticky substance. When heated, wax, and similarly the Backcoating, will change from its sticky state to a liquid state, thus releasing its grip on the mechanical parts it contacts for a time. But this is no real final cure for the problem—it is a band aid. Removal of the Backcoating from the tape removes the chemical agents which are waging a chemical war against the Base and the Oxide. Ending the chemical war is what saves the tape from destruction, makes it playable again and again, and allows the magnetic information to be retrieved in playback on a tape machine.

Baking the tapes may have one beneficial and limited use for tape restoration under special conditions. If the Backcoating has turned into a strong glue which is ready to rip the Oxide off the Base of the tape, thus destroying the tape entirely, it would be useful to use the baking method, if doing so would melt or release the Backcoating's grip on the Oxide long enough for the tape to be rewound and cleaned. If the Backcoating is removed, this is a way to prevent the Backcoating from stripping the Oxide from the base of the tape. In this limited instance, baking the tape in conjunction with the new process of cleaning of the present invention would work together to save the tape from destruction.

SUMMARY OF THE INVENTION

The present invention relates to a process for restoring magnetic recording tape damaged by "Sticky Shed" syndrome. The present invention includes the following inter-related objects, aspects and features:

(1) The process cleans magnetic tapes of the Backcoating which is causing their eventual degradation and destruction. The invention works by first removing the Backcoating in a multi-step process. A liquid cleaner, such as Isopropyl Alcohol, is applied to the Backcoating to dissolve it from and clean it off the Mylar Base as much as possible.

(2) Before the liquid cleaner is applied, steps are taken to prevent the cleaner fluid from getting onto the Oxide side of the tape where the solvent cleaner would do damage if steps are not taken to prevent the solvent from getting onto the Oxide side of the tape. The chemical cleaning is done as quickly as possible to remove the Backcoating. Speed of cleaner application and removal of debris are also important to prevent the solvent from attacking the Base material of the tape.

(3) Immediately after the wet solvent cleaning and removal of the Backcoating is done, the second step is to do a dry-cleaning of the Base surface of the tape to remove the remaining solvent and the debris of any remaining Backcoating. After the removal of the Backcoating and the cleaning of the tape Base, the Oxide side of the tape is given a dry, non-chemical cleaning to remove, as best one can, the residue of contamination of the Backcoating which was deposited on the Oxide side of the tape as the result of physical contact with the Backcoating from the storage on the reel of tape and its layers, as well as any Backcoating residue that may have gotten on the Oxide from various mechanical elements in the tape path of a tape machine which itself was contaminated by the rub off of the Backcoating on the parts of the tape machine. Once fully and properly cleaned, the tape is restored to a useful and long life.

(4) A machine is employed to carry out various mechanical and chemical actions involved in the inventive process in a safe and logical manner. The machine handles the tapes in a safe manner and permits one to monitor the location of the tape where cleaning is taking place based upon the program material and/or measured length of the tape. A microscope or other magnifying device is also provided to allow monitoring of the effectiveness of cleaning operations.

As such, it is a first object of the present invention to provide a process for restoring magnetic recording tape damaged by "Sticky Shed" syndrome.

It is a further object of the present invention to provide such a process in which a solvent such as Isopropyl Alcohol is applied to dissolve and remove the Backcoating from a length of magnetic recording tape.

It is a further object of the present invention to provide such a process in which steps are taken to preclude the solvent from damaging the Oxide side of the tape.

It is a still further object of the present invention to provide such a process in which dry-cleaning of the Base surface of the tape is carried out to remove residual solvent and debris from the Backcoated side of the tape.

It is a yet further object of the present invention to provide a such a process in which the Oxide side of the tape is dry cleaned to remove any solvent and Backcoat debris.

It is a still further object of the present invention to provide such a process in which dry-cleaning of the Oxide side of the tape is carried out to remove residual debris from the Oxide side of the tape.

It is a still further object of the present invention to provide such a process in which a machine is employed to wind and unwind the tape while the process is being carried out, while also being able to monitor the effectiveness of the process.

These and other objects, aspects and features of the present invention will be better understood from the following detailed description of the preferred embodiment when read in conjunction with the appended drawing figures.

SPECIFIC DESCRIPTION OF THE PREFERRED EMBODIMENTS

Figure 1:
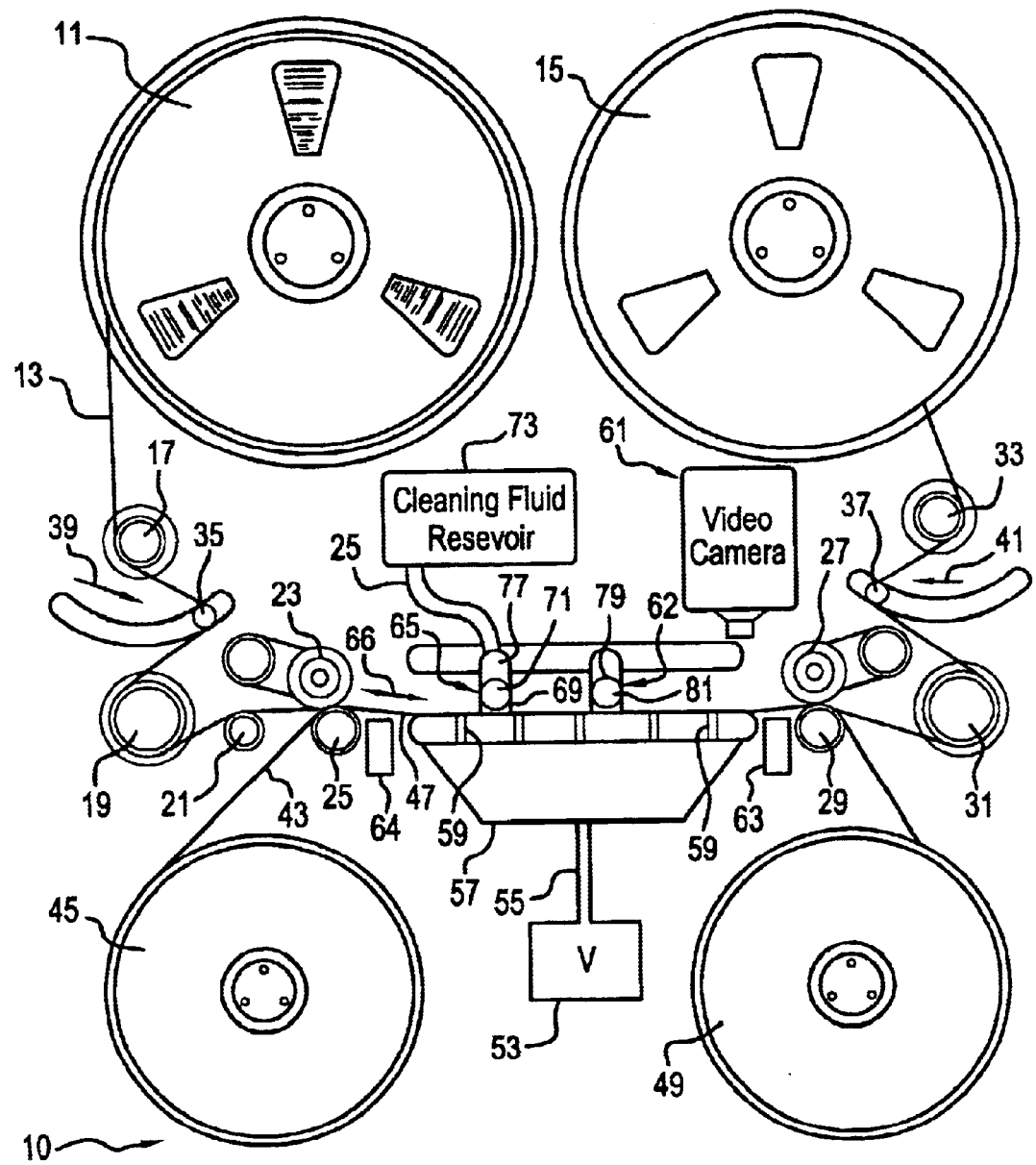
FIG. 1 shows a schematic representation of an apparatus used in practicing the process of the present invention.
Figure 2:
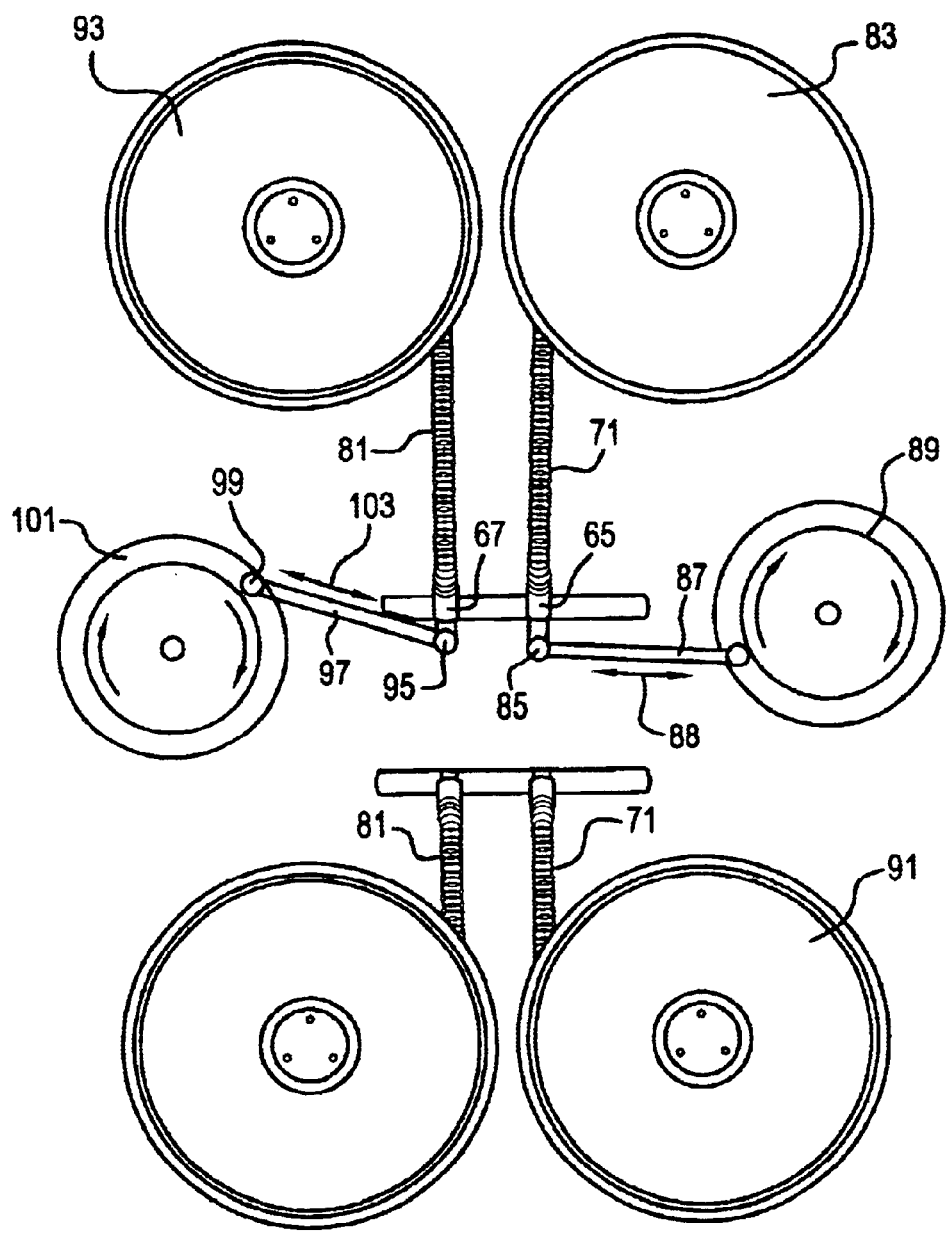
FIG. 2 shows a schematic representation of further details of the apparatus of FIG. 1.

With reference first to FIGS. 1 and 2, a description of an apparatus useful in practicing the teachings of the present invention will now be made.

The apparatus is generally designated by the reference numeral 10 and is seen to include a tape supply reel 11 containing a length of tape 13 rolled thereon, a take-up reel 15, and a series of rollers 17 (which also doubles as a counter-roller), 19, 21, 23, 25, 27, 29, 31 and 33. Tensioners 35 and 37 are biased in the direction of arrows 39 and 41, respectively, and act to tension the tape 13 in the manner shown in FIG. 1.

Absorbent paper 43 is provided on a supply reel 45 and is conveyed over a vacuum and support plate 47, guided to that location by the roller 25 and conveyed from that location over the roller 29 and thence to the absorbent paper take-up reel 49. A source of vacuum 53 is connected to the underside of the paper 43 via a passageway 55, a chamber 57, and a plurality of openings 59 through the plate 47. This vacuum system is designed to retain the paper 43 on the surface of the plate 47 and remove excess solvent.

A video camera 61 is provided at a location where the tape 13 has already traversed the support plate 47 so that the surface of the tape that has been treated in accordance with the teachings of the present invention may be observed to ensure that the inventive process has been successfully undertaken. Additionally, a playback head 63 is provided on the surface of the tape 13 opposite the surface that faces the video camera 61 to facilitate playing of program material from the tape 13 during the conduct of the inventive process.

As should be understood from FIG. 1, and as will be described in greater detail hereinafter, the surface of the tape 13 that is to be subjected to the inventive process is the surface containing what is known as the "Backcoating." The opposite surface facing the playback head 63 in the view of FIG. 1 is the surface that is normally provided with a recording and playback medium such as, for example, Ferric Oxide. Typically, as tape is wound on a supply reel, in the view of FIG. 1, the Metal Oxide surface would be facing upwardly. In order to facilitate practicing of the teachings of the present invention, this orientation has to be inverted. This is either accomplished by twisting the tape 13 180° after it leaves the reel 11 or by completely unreeling the tape 13 and reversing its orientation so that it is oriented with the Backcoating facing up.

With further reference to FIG. 1, it is seen that two cleaning heads are provided which operate independently and allow engagement with the Backcoating of the tape 13. A wet cleaning head is designated by the reference numeral 65 and a dry cleaning head is designated by the reference numeral 67. With reference to FIGS. 1 and 2, the wet cleaning head 65 includes a passageway 69 through which a length of cotton 71 traverses. A reservoir 73 contains a cleaning fluid, preferably, Isopropyl Alcohol, which is conveyed via a conduit 75 to a chamber 77 where the cleaning fluid is exposed to the cotton 71 which absorbs the cleaning fluid and is wetted thereby. An opening in the bottom of the passageway 69 allows the cotton 71 to protrude therethrough as shown in FIG. 1 and engage the Backcoating of the tape 13.

In a similar fashion, the dry cleaning head 67 has a passageway 79 through which a length of cotton 81 travels, and at the location where the passageway 79 passes over the tape 13, a bottom opening is formed allowing the cotton 81 to engage the Backcoating of the tape 13 as is depicted in FIG. 1.

The plate 47, the heads 65 and 67 and any other components that might contact the tape are made of a non-magnetic material since if steel components of the apparatus 10 were to conduct a magnetic charge to the tape, the magnetic memory of the tape would be permanently damaged.

With reference, now, to FIG. 2, further details of the operation of the cleaning heads 65 and 67 will be better understood. With reference to FIG. 2, it is seen that the supply of cotton 71 comprises a reel 83 that supplies the cotton 71 to the location of the head 65. The head 65 is mounted via a pivot 85 and a rod 87 to a plate 89 at the periphery of the plate so that rotations of the plate 89 result in reciprocations of the rod 87 in the directions of the arrow 88 and oscillations of the head 65 in the directions of the arrow 66 shown in FIG. 1. A take-up reel 91 is provided to take up cotton 71 after it has been used to clean the Backcoated side of the tape 13.

In a similar fashion, the cotton 81 traveling through the dry cleaning head 67 is conveyed from a supply reel 93 to the head 67. The head 67 has a pivot 95 that is attached to an arm 97, with its other end attached at another pivot 99 at the periphery of a circular plate 101 that is rotated in the direction of the arrows shown to cause reciprocation of the arm 97 in the directions of the arrow 103. Movements of the arm 97 cause the head 67 to reciprocate in the directions of the arrow 66 in FIG. 1.

Taking into consideration FIGS. 1 and 2, it should be understood that when the plate 89 is rotated by a drive motor (not shown), the wet cleaning head 65 is reciprocated in the directions of the arrow 66 in engagement with the Backcoating of the tape 13. This movement with the cotton 71 impregnated with Isopropyl Alcohol causes a rubbing motion on the Backcoating of the tape 13, thereby cleaning the Backcoating off. With the Backcoating cleaned off and the tape 13 advanced so that the cleaned off surface of the tape 13 is now in alignment with the dry cleaning head 67, rotations of the plate 101 by a motor (not shown) cause the dry cleaning head 67 to reciprocate in the directions of arrow 66, thereby causing the cotton 81 to rub the cleaned surface of the tape 13 to remove any residual solvent and Backcoating particles. The heads 65 and 67 are movable independently of one another.

As should be understood, the absorbent paper 43 is provided underlying the Metal Oxide laden surface of the tape 13 to preclude the cleaning fluid from doing anything to damage the Metal Oxide layer which contains the magnetically retained program material. Thus, any cleaning fluid that flows over the tape 13 and to the sides thereof and which might be in danger of flowing under the tape 13 and onto the Metal Oxide layer is, instead, absorbed by the absorbent paper 43 which is advanced periodically from the supply reel 45 to the take-up reel 49 so that fresh absorbent paper 43 is always underlying the tape 13.

After the tape has advanced beyond the dry cleaning head 67 and the far edge of the plate 47 in the view of FIG. 1, if desired, an additional dry cleaning head may be provided facing the Metal Oxide layer of the tape 13, and preferably before the tape arrives at the playback head 63 so that any minor amount of cleaning fluid that may have gained access to the Metal Oxide layer is gently wiped off to preclude any damage to the program material stored therein.

Figure 3:
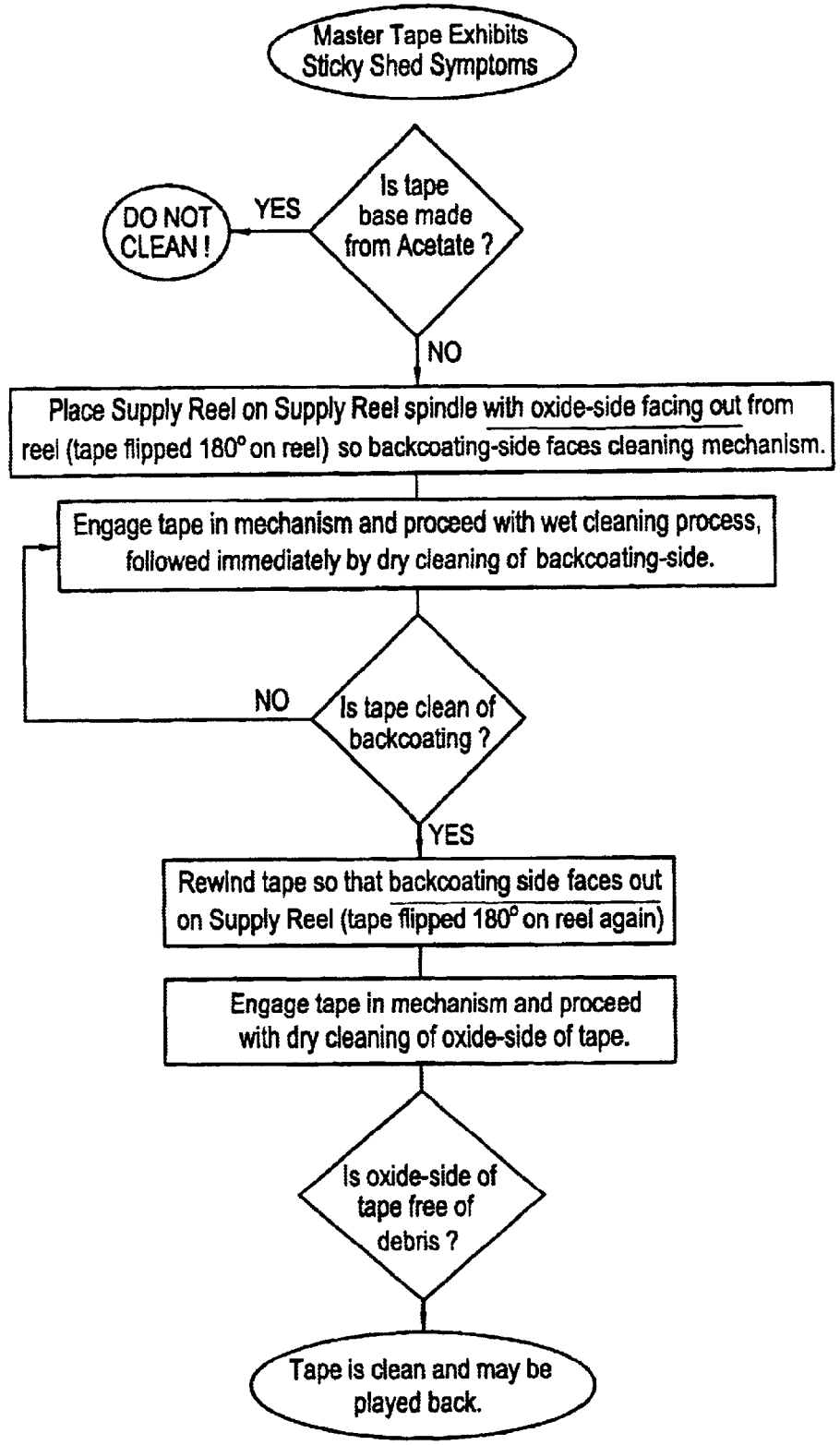
FIG. 3 shows a flowchart depicting the manner of practice of the inventive process.

With the above description in hand, reference is now made to FIG. 3 which shows a flowchart depicting the practicing of the process of the present invention.

As should be well understood, the inventive process is intended to be practiced on recording tape that exhibits signs of the "Sticky Shed" syndrome. If such a tape is to be rid of the "Sticky Shed" syndrome, and it is not made from an acetate base, the Backcoating is cleaned off the tape using any desired means, including, but not limited to, the apparatus illustrated in FIGS. 1 and 2.

First, the tape is conveyed to a location where the Backcoating is scrubbed with Isopropyl Alcohol while the Metal Oxide side of the tape is protected against undue exposure to the Isopropyl Alcohol.

Second, immediately after wet cleaning the Backcoating with Isopropyl Alcohol, additional dry cleaning is conducted using a cleaning medium such as, for example, cotton, to remove any particles of Backcoating that remain on the tape after the use of the Isopropyl Alcohol solvent.

Third, if, after the first and second steps have been completed, there still remains portions of the Backcoating on the tape, the wet cleaning step involving Isopropyl Alcohol is repeated while, again, protecting the Metal Oxide side of the tape from undue exposure to Isopropyl Alcohol, followed by the dry cleaning step using a cleaning medium such as cotton to remove any remaining particles of the Backcoating.

Fourth, after the tape has been successfully cleansed of all Backcoating, the Metal Oxide side of the tape is dry cleaned using a medium such as cotton to ensure first that any solvent that has dripped or oozed thereon is gently removed without any removal of the Metal Oxide, and especially to remove any residue of Backcoating which has adhered to the Oxide side of the tape. In this step, the wet cleaning head is disengaged from the tape surface and not used.

Operationally, this last stage is implemented after the wet and dry cleaning and removal of the Backcoating is finished. When the Backcoating cleaning operation is completed, the tape is now all wound off the Supply Reel onto the Take Up Reel. To begin to effect the dry cleaning of the Oxide, one may twist the tape by 180 degrees, and rewind the tape onto the Supply Reel so that the Oxide side now faces the Cleaning mechanism. However, the Wet Cleaning device is not used as this would put Alcohol on the Oxide and thus damage the tape. Only the Dry Cleaning mechanism is used, and the tape is run through as before with the Backcoating residue fully removed from the Oxide side of the tape. When this is all done, the process of restoring the tape is completed, and the very final step is to once more rewind the tape from Take Up Reel onto the Supply Reel without twisting it 180 degrees, and the tape is now back on its original reel in the correct manner with the Oxide toward the spindle of the Supply Reel. The reel and its restored tape are removed and the next tape installed on the machine for the cleaning process to be applied to the next tape.

Where an apparatus such as that illustrated in FIGS. 1 and 2 is employed, the wet cleaning head may be moved mechanically as shown in FIG. 2 or otherwise to assist in the scrubbing procedure. Additionally, an absorbent paper may be employed to assist in absorbing any solvent that drips or oozes around the Backcoated surface of the tape so that it may be absorbed to preclude it from damaging the Metal Oxide surface of the tape.

Where an apparatus such as that illustrated in FIGS. 1 and 2 is employed, the tape is advanced until a prescribed length of it is on the support plate, whereupon the heads are moved to perform the cleaning function. Thereafter, the next increment of tape is advanced onto the support plate while the cleaned increment is wound toward the take-up reel. During the step of winding the cleaned tape section onto the take-up reel, a video camera may be employed to inspect the tape to ensure that all Backcoating has been removed. At the same or similar location, a playback head can be employed to allow the operator to listen to the cleaned tape. If desired, an additional playback head 64 may be provided at a location in advance of the support plate 47 to allow one to listen to and digitally record the program on a separate recording device before cleaning so that there may be a comparison of the program after cleaning as compared to the program before cleaning to ensure that an improvement has occurred.

Of course, materials other than cotton may be employed as the cleaning medium. Any substance that will absorb Isopropyl Alcohol and that is not chemically reactive to the solvent and not sufficiently abrasive to damage the tape may suitably be employed for this purpose. As should be clear from FIGS. 1–3, the inventive process is conducted without application of heat.

As such, an invention has been disclosed in terms of preferred embodiments thereof which fulfill each and every one of the objects of the invention as set forth hereinabove, and provide a new and useful process for restoring magnetic recording tape damaged by "Sticky Shed" syndrome of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A method of eliminating "sticky sheds" syndrome from magnetic recording tape, said tape including a polyethylene terephtalete base, a Backcoating on one face of said base, and a magnetic recording medium on an opposite face of said base, the method including the steps of:

a) contacting said Backcoating with a solvent; and b) removing said Backcoating from said base with said solvent.

2. The method of claim 1, wherein said contacting step includes the step of impregnating a cleaning medium with said solvent and contacting said Backcoating with said cleaning medium.

3. The method of claim 2, wherein said cleaning medium comprises cotton.

4. The method of claim 3, wherein said solvent comprises isopropyl alcohol.

5. The method of claim 2, further including the step of providing said cleaning medium on a reel and unreeling said cleaning medium into engagement with said Backcoating.

6. The method of claim 5, further including the steps of providing a support for said tape, conveying said tape to said support, and conveying said cleaning medium into engagement with said Backcoating at said support.

7. The method of claim 6, further including the step of providing an absorbent medium underlying said tape on said support.

8. The method of claim 1, further including the step, after said removing step, of dry cleaning said base to remove any remaining Backcoating and solvent.

9. The method of claim 2, further including the step, after said removing step, of dry cleaning said base to remove any remaining Backcoating and solvent.

10. The method of claim 9, wherein said dry cleaning step is carried out by engaging said tape with a cleaning medium.

11. The method of claim 10, wherein said cleaning medium comprises cotton.

12. The method of claim 1, wherein after said removing step, further including the step of dry cleaning said magnetic recording medium to remove any residual Backcoating therefrom.

13. The method of claim 1, wherein said magnetic recording medium comprises a Metal Oxide coating.

14. The method of claim 13, wherein after said removing step, further including the step of dry cleaning said Metal Oxide coating to remove any residual Backcoating therefrom.

15. The method of claim 1, further including the step of locating a camera overlying said tape to monitor said tape.

16. The method of claim 1, further including the step of providing a playback head to play said tape after said removing step.

17. A method of eliminating "sticky shed" syndrome from magnetic recording tape, said tape including a polyethylene terephtalete base, a Backcoating on one face of said base, and a magnetic recording medium on an opposite face of said base, the method including the steps of:

a) contacting said Backcoating with solvent;

b) removing said Backcoating from said base with said solvent, after said removing step, dry cleaning said base to remove any remaining Backcoating and solvent.

18. The method of claim 17, wherein said contacting step includes the step of impregnating cotton with said solvent and contacting said Backcoating with said cotton.

19. The method of claim 17, wherein said solvent comprises isopropyl alcohol.

20. The method of claim 18, further including the step of providing said cotton on a reel and unreeling said cotton into engagement with said Backcoating.

21. The method of claim 20, further including the steps of providing a support for said tape, conveying said tape to said support, and conveying said cotton into engagement with said Backcoating at said support.

22. The method of claim 21, further including the step of providing an absorbent medium underlying said tape on said support.

23. The method of claim 17, wherein said dry cleaning step is carried out by engaging said tape with a cleaning medium.

24. A method of eliminating "sticky shed" syndrome from magnetic recording tape, said tape including a base, a Backcoating on one face of said base, and a magnetic recording medium on an opposite face of said base, the method including the step of removing said Backcoating from said base without application of heat.

25. The method of claim 24, wherein said removing step comprises chemically removing said Backcoating from said base.

\* \* \* \* \*